(12) United States Patent
Lucker (10) Patent No.: US 10,941,836 B2
(45) Date of Patent: Mar. 9, 2021

(54) ROTORCRAFT INTERNAL TRANSFER MEMBER TRANSMISSION

(71) Applicant: SIKORSKY AIRCRAFT CORPORATION, Stratford, CT (US)

(72) Inventor: Brian E. Lucker, Shelton, CT (US)

(73) Assignee: Sikorsky Aircraft Corporation, Stratford, CT (US)

(*) Notice: Subject to any disclaimer, the term of this patent is extended or adjusted under 35 U.S.C. 154(b) by 990 days.

(21) Appl. No.: 15/471,713

(22) Filed: Mar. 28, 2017

(65) Prior Publication Data

US 2018/0283499 A1  Oct. 4, 2018

(51) Int. Cl.
| | | |
|---|---|---|
| *F16H 1/22* | (2006.01) | |
| *B64D 35/00* | (2006.01) | |
| *B64C 27/10* | (2006.01) | |
| *B64C 27/12* | (2006.01) | |

(52) U.S. Cl.
CPC ............. *F16H 1/222* (2013.01); *B64C 27/10* (2013.01); *B64C 27/12* (2013.01); *B64D 35/00* (2013.01)

(58) Field of Classification Search
CPC ......... F16H 1/222; B64C 27/12; B64C 27/10; B64D 35/00
See application file for complete search history.

(56) References Cited

U.S. PATENT DOCUMENTS

| | | |
|---|---|---|
| 798,907 A | 9/1905 | Knudsen |
| 1,195,119 A | 8/1916 | Westinghouse |
| 2,270,567 A | 1/1942 | Slider |
| 2,313,183 A | 3/1943 | Trbojevich |
| 2,908,187 A | 10/1959 | Saari |
| 2,911,851 A | 11/1959 | Wachs |
| 2,924,998 A | 2/1960 | Sem et al. |
| 2,951,395 A | 9/1960 | Smith et al. |
| 2,954,704 A | 10/1960 | Saari |
| 3,129,608 A * | 4/1964 | Watson ............... F16H 1/222 74/665 C |
| 3,255,825 A | 6/1966 | Mouille et al. |
| 3,382,838 A | 5/1968 | Bergstedt |
| 3,564,937 A | 2/1971 | Soloviev et al. |
| 3,602,068 A | 8/1971 | White |
| 3,782,223 A | 1/1974 | Watson |
| 3,871,248 A | 3/1975 | Barish |
| 3,977,632 A | 8/1976 | Watson |
| 4,043,216 A | 8/1977 | Steer |
| 4,068,470 A | 1/1978 | Sargisson et al. |
| 4,251,987 A | 2/1981 | Adamson |

(Continued)

FOREIGN PATENT DOCUMENTS

| | | |
|---|---|---|
| DE | 1042388 A1 | 10/1958 |
| FR | 652043 A | 3/1929 |

(Continued)

*Primary Examiner* — Valentina Xavier
(74) *Attorney, Agent, or Firm* — Michael Best & Friedrich LLP (57) ABSTRACT

A transfer member includes a body including a first end having a first diameter and a second end having a second diameter. The second diameter is greater than the first diameter. A plurality of engagement features are positioned coaxially about the body and are separated by an axial gap. Each of the plurality of engagement features includes a beveled surface engageable to transfer rotation to or from the transfer member.

19 Claims, 7 Drawing Sheets

(56) References Cited

U.S. PATENT DOCUMENTS

| | | |
|---|---|---|
| 4,484,491 A | 11/1984 | Cocking |
| 4,486,051 A | 12/1984 | Becker |
| 4,489,625 A | 12/1984 | White |
| 4,682,512 A | 7/1987 | Peterson |
| 4,744,263 A | 5/1988 | Kuiken |
| 4,811,627 A | 3/1989 | Mouille |
| 4,829,850 A | 5/1989 | Soloy |
| 4,899,609 A | 2/1990 | Nagata |
| 4,983,153 A | 1/1991 | Luijten |
| 5,108,043 A | 4/1992 | Canavespe |
| 5,114,287 A | 5/1992 | Ervay et al. |
| 5,135,442 A | 8/1992 | Bossler, Jr. |
| 5,149,311 A | 9/1992 | Luijten |
| 5,178,028 A | 1/1993 | Bossler, Jr. |
| 5,189,929 A | 3/1993 | Chory |
| 5,233,886 A | 8/1993 | Bossler, Jr. |
| 5,247,856 A | 9/1993 | Cuypers |
| 5,271,289 A | 12/1993 | Baxter, Jr. |
| 5,472,385 A | 12/1995 | Vu |
| 5,472,386 A | 12/1995 | Kish |
| 5,537,889 A | 7/1996 | Shigeura et al. |
| 5,572,910 A * | 11/1996 | Tomaselli ............... B64C 27/12 416/169 R |
| 5,782,433 A | 7/1998 | Goi et al. |
| 5,797,185 A | 8/1998 | Sammataro et al. |
| 5,807,202 A * | 9/1998 | Sammataro ............. B64C 27/14 244/60 |
| 6,302,356 B1 * | 10/2001 | Hawkins ................ B64C 27/12 244/17.11 |
| 6,672,538 B2 * | 1/2004 | Millea ..................... B64C 27/20 244/12.3 |
| 7,434,764 B2 * | 10/2008 | Lappos ................... B64C 27/14 244/17.11 |
| 7,507,180 B2 | 3/2009 | Robuck |
| 9,752,500 B2 * | 9/2017 | Ullyott ..................... F02C 3/113 |

FOREIGN PATENT DOCUMENTS

| | | |
|---|---|---|
| JP | S58196348 A | 11/1983 |
| NL | 8800415 A | 9/1989 |
| WO | 9218279 A1 | 10/1992 |

* cited by examiner

ROTORCRAFT INTERNAL TRANSFER MEMBER TRANSMISSION

BACKGROUND

Exemplary embodiments of the disclosure generally relate to a rotary wing aircraft, and more particularly, to a transmission system for a rotor system of a rotary wing aircraft.

In a typical rotorcraft or propeller driven aircraft, a transmission system transfers power from an engine to a rotor or propeller of the aircraft. Since the rotational velocity of the rotor or propeller is significantly lower than the rotational velocity of the engine, the engine rotational velocity must be reduced by the transmission system. Many conventional transmission systems include a number of gear stages for reducing the rotational speed before the final rotational output is provided to the rotor. However, these systems are substantial in not only size, but also complexity. Typically, this is due to the final gears which, although effective, are relatively large and heavy. Additionally, relatively large bearings are required to support the forces generated between the input shafts and corresponding gears which further increase the system size and weight.

BRIEF DESCRIPTION

According to an embodiment, a transfer member includes a body including a first end having a first diameter and a second end having a second diameter. The second diameter is greater than the first diameter. A plurality of engagement features are positioned coaxially about the body and are separated by an axial gap. Each of the plurality of engagement features includes a beveled surface engageable to transfer rotation to or from the transfer member.

In addition to one or more of the features described above, or as an alternative, in further embodiments the plurality of engagement features includes a first engagement feature and a second engagement feature and the beveled surface of each of the plurality of engagement features includes a plurality of teeth, the plurality of teeth of the first engagement feature corresponding to teeth of an output shaft and the plurality of teeth of the second engagement feature corresponding to teeth of an input shaft so as to transfer rotation between the input and output shaft via the transfer member, the plurality of teeth of the first engagement feature being separated from the plurality of teeth of the second engagement feature by the axial gap.

In addition to one or more of the features described above, or as an alternative, in further embodiments the plurality of teeth of at least one of the plurality of engagement features is straight cut.

In addition to one or more of the features described above, or as an alternative, in further embodiments the plurality of teeth of at least one of the plurality of engagement features is spiral cut.

In addition to one or more of the features described above, or as an alternative, in further embodiments an angle of the beveled surface relative to a surface of the body in the axial gap of one of the plurality of engagement features is distinct from an angle of the beveled surface relative to the surface of the body in the axial gap of another one of the plurality of engagement features.

According to another embodiment, a transmission includes a first output shaft and a second output shaft. At least one rotatable transfer member has a plurality of engagement features arranged coaxially and separated by an axial gap. A first engagement feature of the plurality of engagement features is configured to drive the first output shaft coupled thereto at a first rotational speed. A second engagement feature of the plurality of engagement features is configured to drive the second output shaft coupled thereto at a second rotational speed. The first rotational speed is faster than an input rotational speed provided to the at least one transfer member, and the second rotational speed is slower than the input rotational speed provided to the at least one transfer member.

In addition to one or more of the features described above, or as an alternative, in further embodiments comprising a shaft gear including a shaft gear engagement feature configured to cooperate with one of the plurality of engagement features and one of the first and second output shafts.

In addition to one or more of the features described above, or as an alternative, in further embodiments each of the plurality of engagement features is arranged at a distinct position separated from an adjacent one of the engagement features by the axial gap and between a first end and a second end of the at least one transfer member.

In addition to one or more of the features described above, or as an alternative, in further embodiments comprising a transmission plate and a bearing block arranged within a hollow interior of the transmission plate, the at least one transfer member being coupled to both the transmission plate and the bearing block.

In addition to one or more of the features described above, or as an alternative, in further embodiments the bearing block is generally triangular in shape and the at least one transfer member is positioned at a corner of the bearing block.

In addition to one or more of the features described above, or as an alternative, in further embodiments the at least one transfer member includes a plurality of transfer members and the plurality of transfer members are substantially identical.

In addition to one or more of the features described above, or as an alternative, in further embodiments the shaft gear engagement feature is configured to cooperate with one of the plurality of engagement features of each of the plurality of transfer members.

In addition to one or more of the features described above, or as an alternative, in further embodiments comprising another shaft gear including another shaft gear engagement feature configured to cooperate with one of the plurality of engagement features.

In addition to one or more of the features described above, or as an alternative, in further embodiments the shaft gear engagement feature and the another shaft gear engagement feature are configured to cooperate with different engagement features of the plurality of engagement features.

In addition to one or more of the features described above, or as an alternative, in further embodiments the at least one transfer member is configured to drive the shaft gear in a first direction about an axis of rotation, and the at least one transfer member is configured to drive the another shaft gear in a second direction about the axis of rotation.

In addition to one or more of the features described above, or as an alternative, in further embodiments comprising an input for rotating the at least one transfer member, the input being provided by engine.

In addition to one or more of the features described above, or as an alternative, in further embodiments the transmission is part of a rotary wing aircraft and at least one of the first output shaft and the second output shaft is coupled to a rotor system for driving a plurality of rotor blades about a rotational axis.

According to another embodiment, a transmission includes a bearing block for supporting at least one rotatable shaft. At least one rotatable transfer member has a plurality of engagement features. The at least one rotatable transfer member is mounted to an exterior of the bearing block. A shaft gear is mounted to the at least one rotatable shaft and includes a shaft gear engagement feature configured to cooperate with one of the plurality of engagement features.

In addition to one or more of the features described above, or as an alternative, in further embodiments the at least one rotatable transfer member has a generally hollow interior and a portion of the bearing block is received within the hollow interior.

In addition to one or more of the features described above, or as an alternative, in further embodiments a first engagement feature of the plurality of engagement features is positioned at a first end of the at least one rotatable transfer member and when the shaft gear engagement feature is engaged with the first engagement feature, the at least one transfer member and the bearing block are nested within the shaft gear.

BRIEF DESCRIPTION OF THE DRAWINGS

The subject matter is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Figure 1:
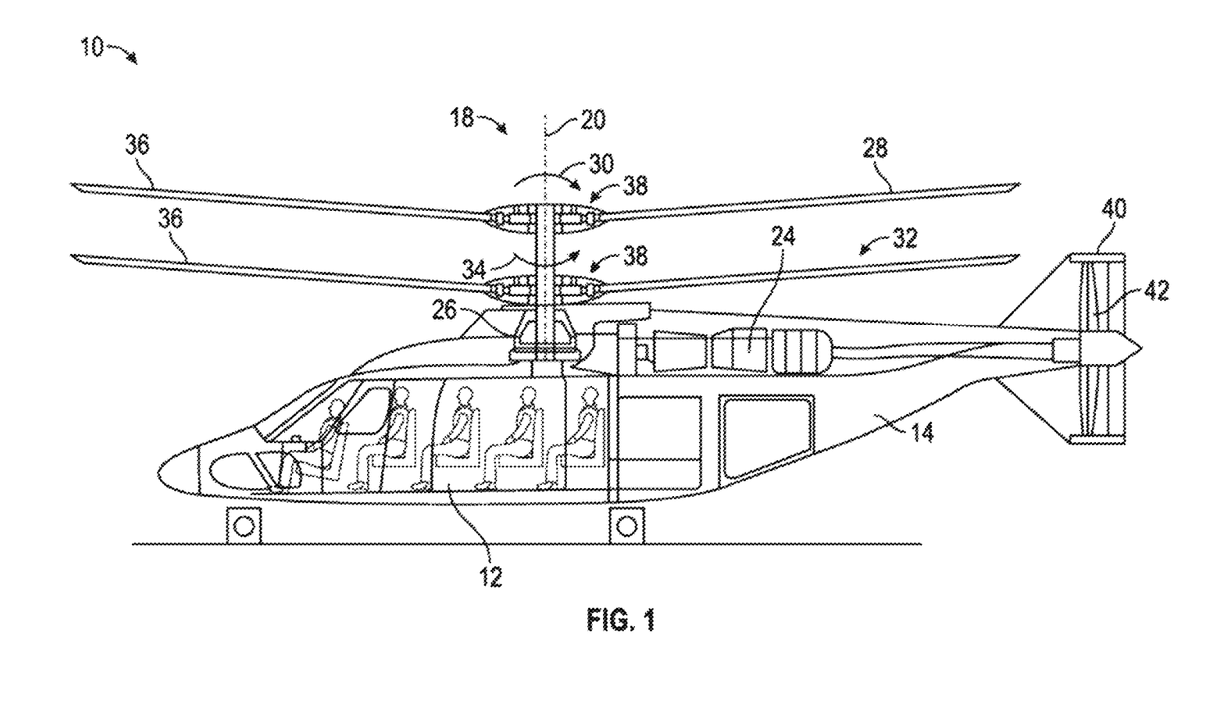
FIG. 1 is a general perspective side view of an example of a rotary wing aircraft.
Figure 2:
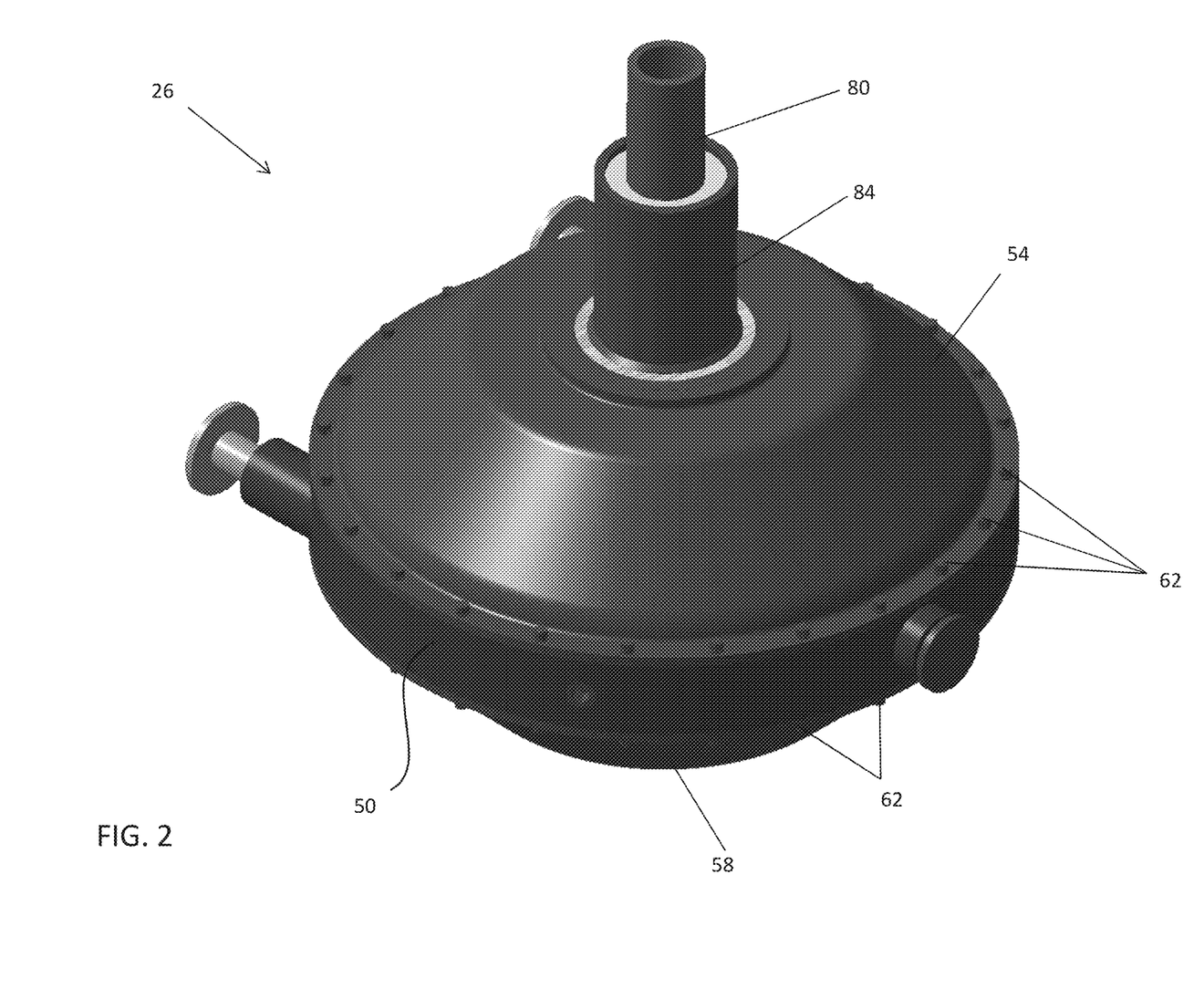
FIG. 2 is a perspective view of a transmission according to an embodiment.
Figure 3:
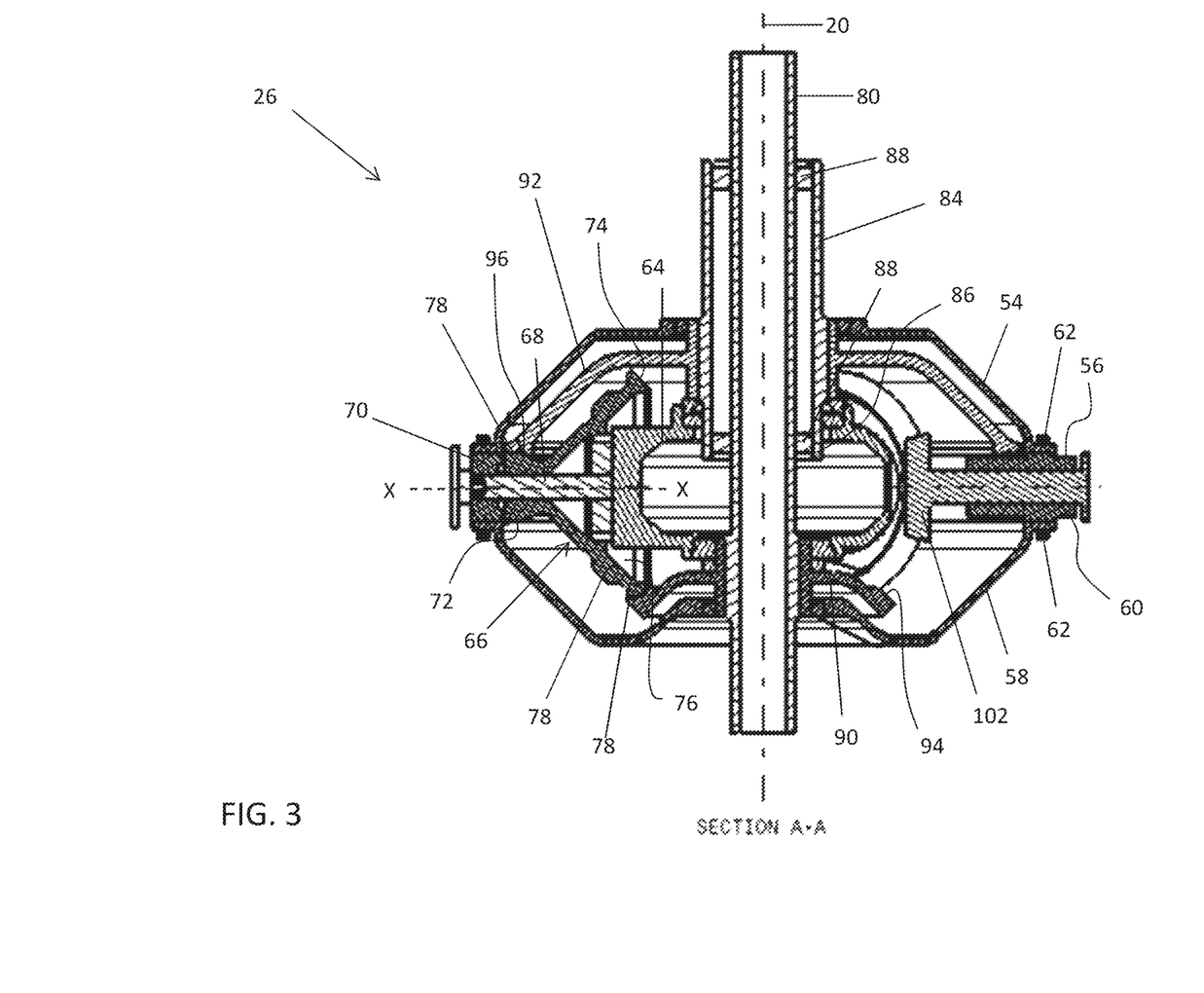
FIG. 3 is a cross-sectional view of the transmission of FIG. 2 according to an embodiment.
Figure 4:
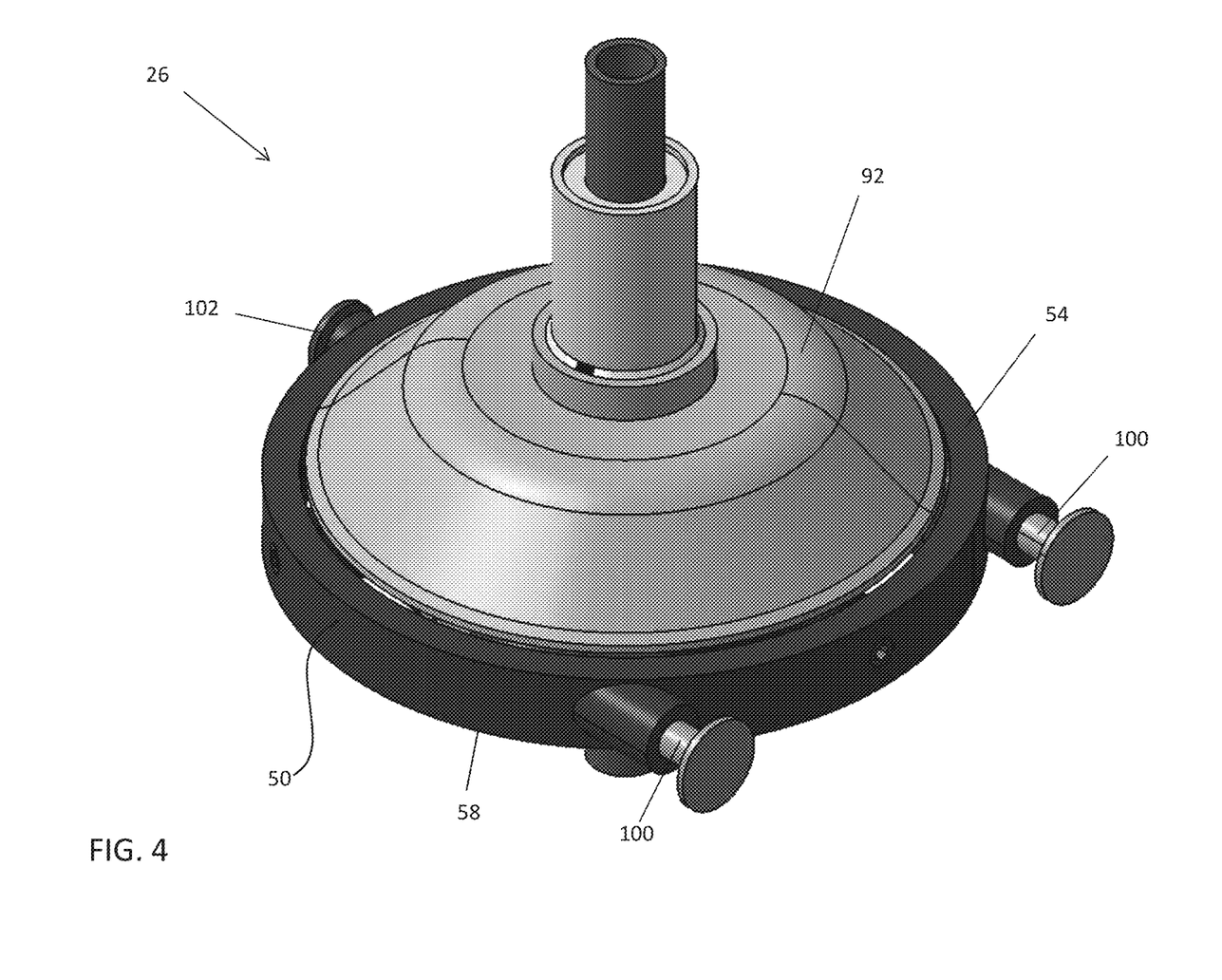
FIG. 4 is a perspective view of a transmission with the housing removed according to an embodiment.
Figure 5:
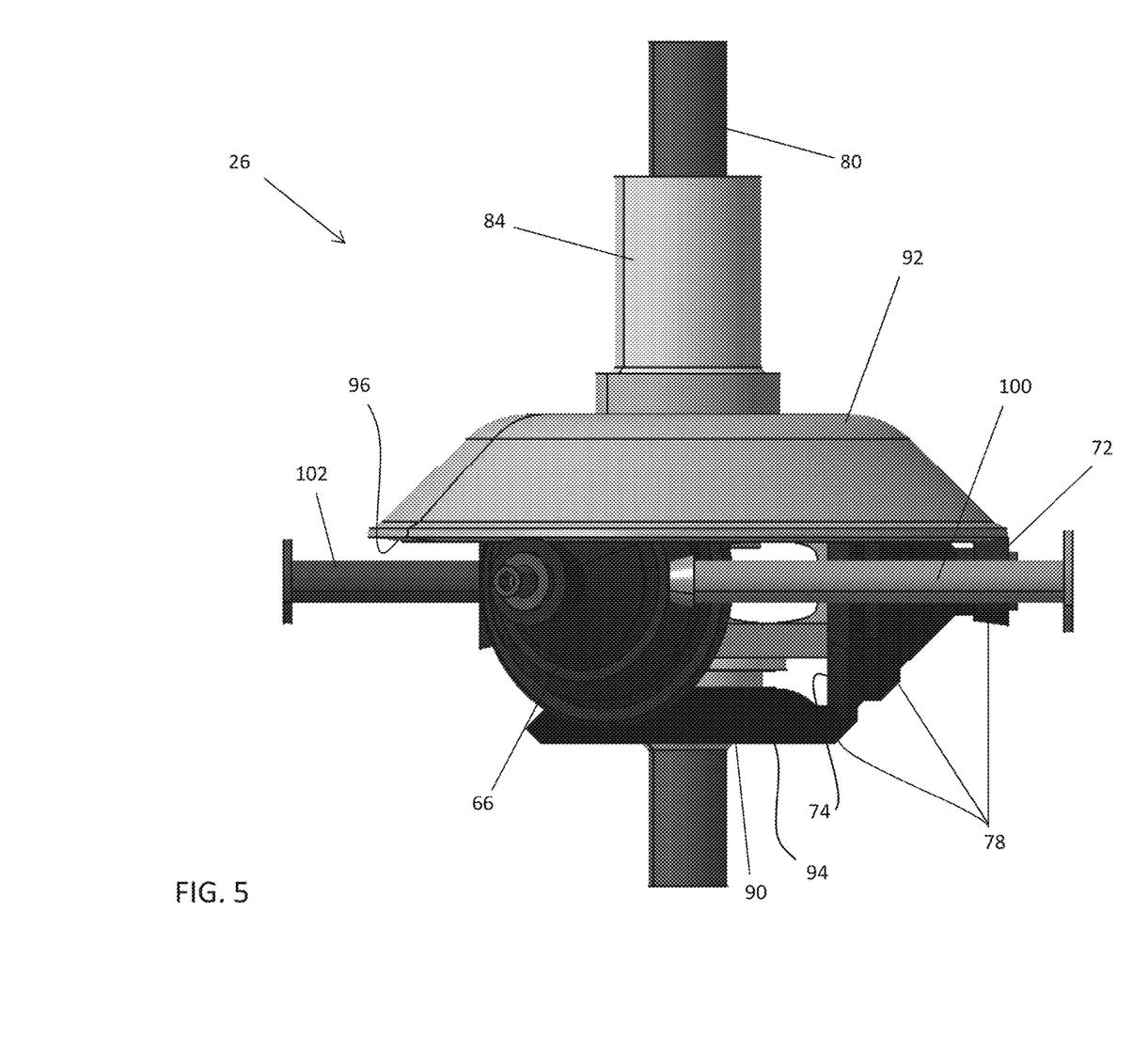
FIG. 5 is a front view of a transmission with the housing and center plate removed according to an embodiment.
Figure 6:
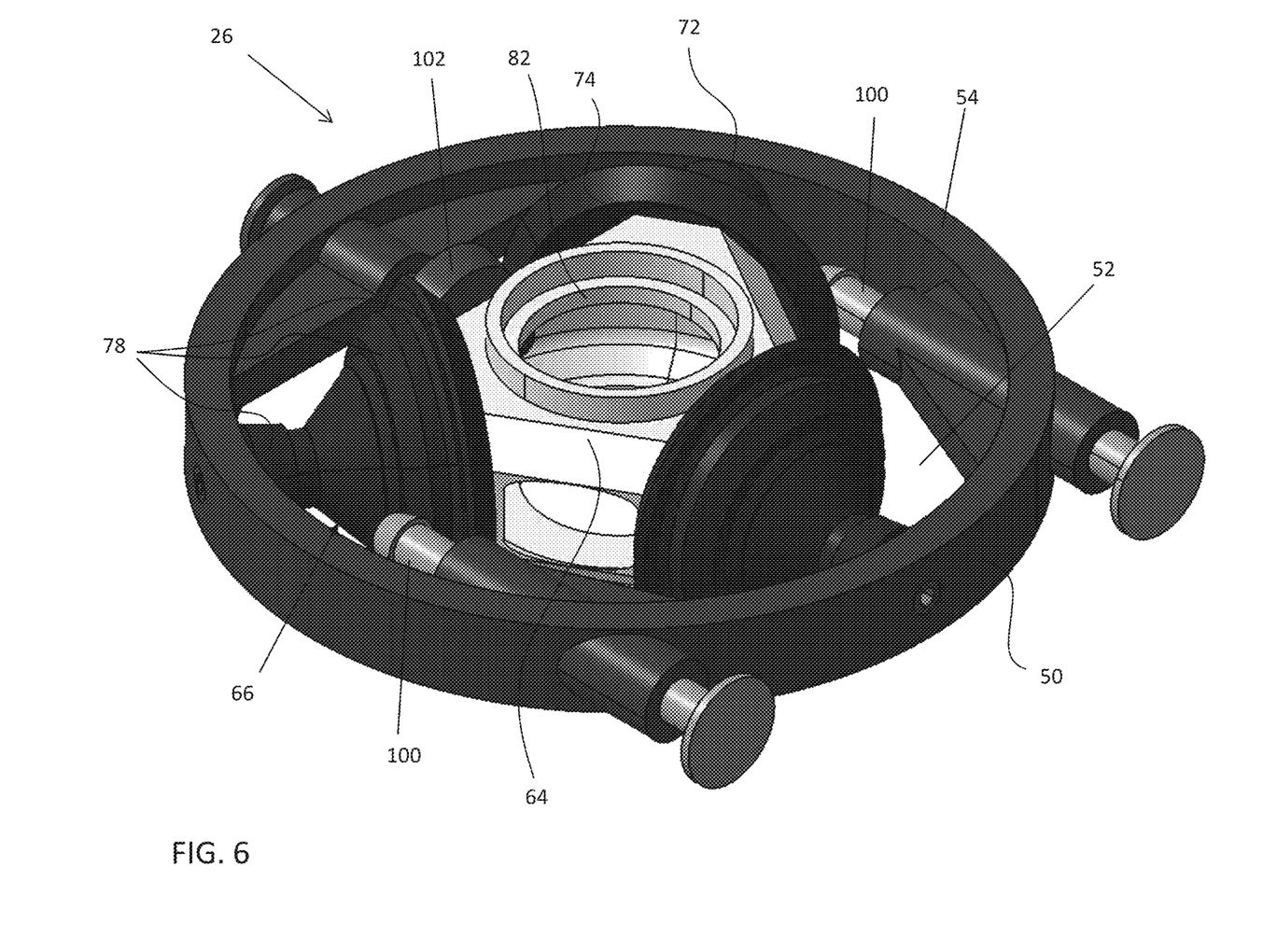
FIG. 6 is a perspective view of a portion of a transmission according to an embodiment.
Figure 7:
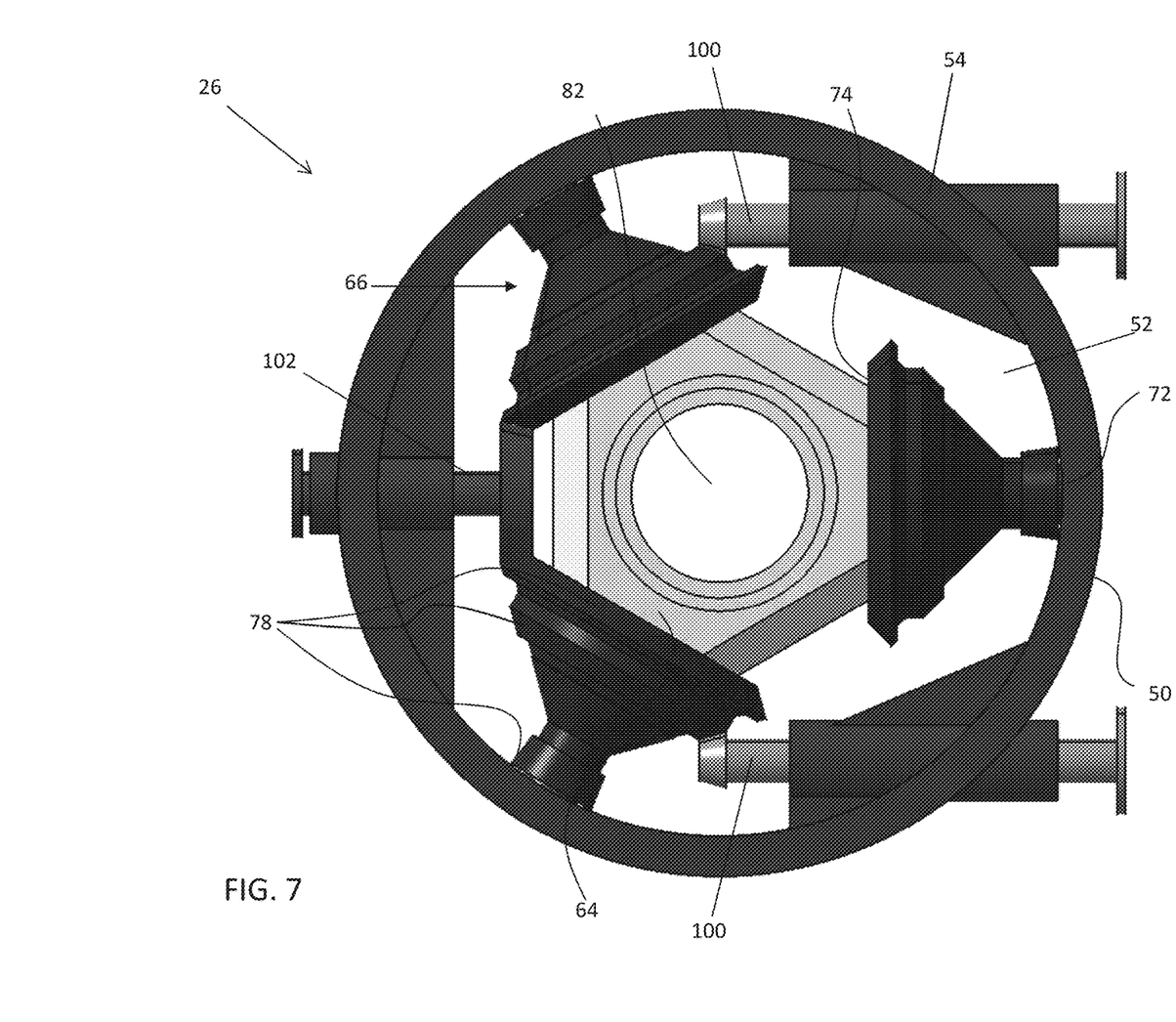
FIG. 7 is a plan view of the portion of a transmission of FIG. 6 according to an embodiment.

Referring now to FIG. 1, a schematic view of an example of a rotary wing aircraft, such as a helicopter for example, is illustrated. The rotary wing aircraft 10 includes an airframe 12 with an extending tail 14. A dual, counter-rotating coaxial main rotor assembly 18 is located at the airframe 12 and rotates about a main rotor axis 20. The main rotor assembly 18 is driven by a power source, for example, an engine 24 via a transmission 26. The main rotor assembly 18 includes an upper rotor assembly 28 driven in a first direction 30 about the main rotor axis 20, and a lower rotor assembly 32 driven in a second direction 34 about the main rotor axis 20, opposite to the first direction 30. While, in FIG. 1, the first direction 30 is illustrated as counter-clockwise and the second direction 34 is illustrated as clockwise, it is to be appreciated that in some embodiments the directions of rotation of the upper rotor assembly 28 and lower rotor assembly 32 may be reversed. Each of the upper rotor assembly 28 and the lower rotor assembly 32 include a plurality of rotor blades 36 secured to a rotor hub 38. In some embodiments, the helicopter 10 further includes a translational thrust system 40 located at the extending tail 14 to provide translational thrust for the helicopter 10. The translational thrust system 40 includes a propeller rotor 42 connected to and driven by the engine 24 via the gearbox 26. While shown in the context of a pusher-prop configuration, it is understood that the propeller rotor 42 could also be more conventional puller prop or could be variably facing so as to provide yaw control in addition to or instead of translational thrust.

Referring now to FIGS. 2-7, an example of a transmission, such as the transmission 26 configured to drive the main rotor assembly 18 about an axis of rotation 20 of FIG. 1 is illustrated in more detail. The transmission 26 includes a cylindrical transmission plate 50 having a substantially hollow interior 52 (best shown in FIG. 7). An upper housing 54 is mounted to an upper surface 56 of the transmission plate 50, and a similar lower housing 58 is mounted to a lower surface 60 of the transmission plate 50, opposite the upper housing 54. The upper and lower housings 54, 58 may attach to the transmission plate 50 using one or more fasteners 62, such as bolts, adhesives or other combining elements. The upper and lower housings 54, 58, may, but need not be, substantially identical, and need not be used in all aspects. In an embodiment, at least one of the upper and lower housing 54, 58 is positioned external to the airframe 12 and as a result functions as a fairing to reduce drag.

Located generally centrally within the hollow interior 52 of the transmission plate 50 is a bearing block 64. In an embodiment, the bearing block 64 and the transmission plate 50 are oriented substantially parallel to one another in an overlapping relationship. At least one transfer member 66 is mounted within the hollow interior 52 between the bearing block 64 and the transmission plate 50. As used herein the term "transfer member" is intended to describe a singular component configured to transmit an input to an output at the same or a geared ratio. In an embodiment, the bearing block 64 is generally triangular in shape, and a transfer member 66 is mounted at each of the corners of the bearing block 64. However, it should be understood that other configurations of the bearing block 64 are also contemplated herein.

In embodiments where the transmission includes a plurality of transfer members 66, the transfer members 66 are substantially identical. Each transfer members 66 is rotatably coupled to the bearing block 64 and the transmission plate 50 via a shaft 68 and at least one bearing 70 and rotates about an axis X which is generally perpendicular to the axis of rotation 20. A first end 72 of the at least one transfer member 66 is disposed adjacent the plate 50, and a second opposite end 74 of the transfer member 66 is located generally adjacent the bearing block 64. In an embodiment, the diameter at the first end 72 of the at least one transfer member 66 is substantially smaller than the diameter at the second end 74 such that the transfer members 66 are generally conical in shape. The diameter at the second end 74 of the transfer members 66 may be larger than a thickness of the bearing block 64 such that in embodiments where the transfer members 66 have a generally hollow interior 76, a portion of the bearing block 64 may be positioned within the interior 76 of a corresponding transfer member 66. While shown with the axis X substantially perpendicular to the axis of rotation 20, it is understood that the axes X and 20 could intersect at other angles.

Each transfer member 66 includes at least one engagement features 78 configured to couple with an adjacent component such that rotation is transmitted between the transfer member 66 and the component. In the illustrated, non-limiting embodiment, the at least one engagement feature 78 includes a beveled surface that extends about a periphery of the transfer member 66. The beveled surface of the engagement feature may include straight cut teeth, or alternatively, spiral cut teeth. However, it should be understood that embodiments where the beveled engagement feature 78 includes a smooth surface are also contemplated herein.

As shown in the FIGS., each transfer member 66 includes multiple engagement features 78. In an embodiment, the angle of the beveled surface of each engagement feature 78 relative to vertical is different. Each of the plurality of engagement features 78 is located at a distinct axial position over a length of the transfer member 66. Accordingly, adjacent engagement features 78 are separated from one another by an axial gap. In an embodiment, the plurality of transfer members 66 include a first engagement feature 78 extending about a periphery of the transfer member 66 at the first end 72, a second engagement feature 78 extending about a periphery of the transfer member 66 at the second end 74, and a third engagement feature 78 extending about a periphery of the transfer member 66 at a location between the first and second ends. Because the diameter varies over the length of the transfer members 66, the tangential velocity of each engagement feature 78 of the transfer member 66 is different with respect to axis X. Accordingly, each engagement feature 78 may be configured to reduce, increase, or maintain a speed (revolutions per minute) with respect to an input and an output operably coupled thereto. In an embodiment, each engagement feature 78 has a different gear tooth interface ratio which will also result in different outputs.

An inner shaft 80, for example associated with the upper rotor assembly 28 of the rotary wing aircraft 10, extends through the transmission 26, and in particular, through a central opening 82 (FIG. 6) formed in the bearing block 64. An outer shaft 84, such as associated with the lower rotor assembly 32 of the rotary wing aircraft 10 for example, is rotatably coupled to the bearing block 64 at a first end 86. The outer shaft 84 is arranged concentrically with the inner shaft 80 and one or more bearings 88 are positioned there between to allow the inner and outer shaft 80, 84 to rotate freely relative to one another.

An inner shaft gear 90 is coupled to the inner shaft 80 such that the inner shaft gear 90 and the inner shaft 80 rotate together about the axis 20. The inner shaft gear 90 is positioned adjacent a first side of the bearing block 64 and transfer members 66. Similarly, an outer shaft gear 92 configured to rotate with the outer shaft 84 about the axis 20 and is arranged adjacent a second side of the bearing block 64 and transfer members 66, opposite the inner shaft gear 90. In the illustrated, non-limiting embodiment, the inner shaft gear 90 is located between the bearing block 64 and the lower housing 58 and the outer shaft gear 92 is positioned between the bearing block 64 and the upper housing 54. However, embodiments where the inner shaft gear 90 is located between the bearing block 64 and the upper housing 54 and the outer shaft gear 92 is positioned between the bearing block 64 and the lower housing 58 are also contemplated herein.

The inner shaft gear 90 includes an inner shaft gear engagement feature 94 configured to cooperate with an engagement feature 78 on each of the plurality of transfer members 66. It should be understood that the inner shaft engagement feature 94 is configured to interact with the same engagement feature 78 on each of the plurality of transfer members 66, such as the engagement feature 78 adjacent the first end 72 of each transfer member 66 for example. The outer shaft gear 92 similarly includes an outer shaft gear engagement feature 96 configured to cooperate with an engagement feature 78 on each of the plurality of transfer members 66. The outer shaft engagement feature 96 is also configured to interact with the same engagement feature 78 on each of the plurality of transfer members 66, such as the engagement feature 78 adjacent the second end 74 of each transfer member 66 for example.

In an embodiment, the inner shaft gear engagement feature 94 and the outer shaft engagement feature 96 may interface with the same engagement features 78 on the one or more transfer members 66. In such instances, the inner shaft 80 and the outer shaft 84 are configured to rotate at the same speed. Alternatively, the inner shaft gear engagement feature 94 and the outer shaft engagement feature 96 may interface with different engagement features 78 such that the inner shaft 80 and the outer shaft 84 have different rotational speeds. Accordingly, by forming engagement features having different diameters over the length of the one or more transfer members 66, a variety of gear ratios can be achieved to control the rotational speed of both the inner and outer shafts 80, 84. It should be understood that although the transmission illustrated and described herein is configured to rotate both an inner shaft 80 and an outer shaft 84, embodiments where the transmission 26 is coupled to only a single shaft are also within the scope of the disclosure.

At least one input shaft 100 associated with an engine 24 of the rotary wing aircraft 10 communicates with a transfer member 66 of the transmission 26 to rotate the transfer member 66 about its axis X. In the illustrated, non-limiting embodiment, the transmission 26 includes two input shafts 100, one associated with each engine 24, configured to drive two distinct transfer members 66 of the transmission 26 at the same rotational speed. However, it should be understood that a system having only a single input shaft 100 is also contemplated herein. In an embodiment, the transmission 26 additionally includes an output shaft 102 operably coupled to at least one of the transfer members 66. The engagement feature 78 configured to drive the output shaft 102 may be selected based on the needs of the component coupled thereto. In alternative embodiments, it should be understood that shaft 102 may be configured as an input source, and shafts 100 may be outputs associated with external interfaces. As a result, both of the outputs may be driven at a rotational speed slower than or faster than the input rotational speed.

In operation, the at least one input shaft associated with an engine engages an engagement feature 78 on a corresponding transfer member 66, causing the transfer member to rotate about is axis X. The contact formed between the engagement feature 94 of the inner shaft gear 90 and a corresponding engagement feature 78 on the plurality of transfer members 66 drives the inner shaft gear 90 and the inner shaft 80 coupled thereto at a desired rotational speed. Similarly, through the interface formed between the engagement feature 96 of the outer shaft gear 92 and an engagement feature 78 of the transfer members 66, the outer shaft gear 92, and therefore the outer shaft 84 is rotated about its axis 20 at a desired rotational speed. It should be understood that rotation of the transfer member 66 driven by the input shaft 100 is transmitted to the remainder of the transfer members 66 via engagement with the inner and outer shaft gears 90, 92.

By mounting the inner shaft gear 90 and the outer shaft gear 92 on opposing sides of the transmission plate 50 in engagement with an engagement feature 78 of the transfer member 66, rotation of the gears 90, 92 in opposite directions can be achieved. As the transfer member 66 rotates about its axis X, a first side of the transfer member 66 drives the inner shaft gear 90 in a first direction and a second side of the transfer member drive the outer shaft gear 94 in a second, opposite direction, thereby achieving counter-rotation with a complex and cumbersome gearing system.

The transmission 26 disclosed herein provides a single multi-ratio gear stage that delivers counter-rotating outputs at mixed ratios. The transmission 26 is compatible for use with several systems and provides a simplified solution having a high payload to transmission weight ratio. Although the transmission 26 is described with reference to a rotary wing aircraft 10, it should be understood that the transmission 26 may be used in any application where an input is used to drive one or more components about an axis of rotation.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. By way of example, aspects of the invention can be used with single rotor helicopters for the main and tail rotors, fixed wing aircraft propellers, drones, maritime propulsion systems, and wind/water turbine transmission. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

The invention claimed is:

1. A transfer member comprising:
a body including a first end having a first diameter and a second end having a second diameter, the second diameter being greater than the first diameter; and
a plurality of engagement features positioned coaxially about the body and being separated by an axial gap, each of the plurality of engagement features including a beveled surface engageable to transfer rotation to or from the transfer member, wherein the plurality of engagement features includes a first engagement feature and a second engagement feature, and the beveled surface of the first engagement feature extends in a first direction relative to an axis of rotation of the transfer member and the beveled surface of the second engagement feature extends in a second, opposite direction relative to an axis of rotation of the transfer member.

2. The transfer member of claim 1, wherein the beveled surface of each of the plurality of engagement features includes a plurality of teeth, the plurality of teeth of the first engagement feature corresponding to teeth of an output shaft and the plurality of teeth of the second engagement feature corresponding to teeth of an input shaft so as to transfer rotation between the input and output shaft via the transfer member, the plurality of teeth of the first engagement feature being separated from the plurality of teeth of the second engagement feature by the axial gap.

3. The transfer member of claim 2, wherein the plurality of teeth of at least one of the plurality of engagement features is straight cut.

4. The transfer member of claim 2, wherein the plurality of teeth of at least one of the plurality of engagement features is spiral cut.

5. The transfer member of claim 2, wherein an angle of the beveled surface relative to a surface of the body in the axial gap of one of the plurality of engagement features is distinct from an angle of the beveled surface relative to the surface of the body in the axial gap of another one of the plurality of engagement features.

6. A transmission comprising:
a first output shaft;
a second output shaft; and
at least one rotatable transfer member having a plurality of engagement features arranged coaxially and are separated by an axial gap, a first engagement feature of the plurality of engagement features is configured to drive the first output shaft coupled thereto at a first rotational speed, and a second engagement feature of the plurality of engagement features is configured to drive the second output shaft coupled thereto at a second rotational speed, the first rotational speed being faster than an input rotational speed provided to the at least one transfer member, and the second rotational speed being slower than the input rotational speed provided to the at least one transfer member.

7. The transmission of claim 6, further comprising a shaft gear including a shaft gear engagement feature configured to cooperate with one of the plurality of engagement features and one of the first and second output shafts.

8. The transmission of claim 6, wherein each of the plurality of engagement features is arranged at a distinct position separated from an adjacent one of the engagement features by the axial gap and between a first end and a second end of the at least one transfer member.

9. The transmission of any of claim 6, further comprising:
a transmission plate; and
a bearing block arranged within a hollow interior of the transmission plate, the at least one transfer member being coupled to both the transmission plate and the bearing block.

10. The transmission of claim 9, wherein the bearing block is generally triangular in shape and the at least one transfer member is positioned at a corner of the bearing block.

11. The transmission of claim 7 wherein the at least one transfer member includes a plurality of transfer members and the plurality of transfer members are substantially identical.

12. The transmission of claim 11, wherein the shaft gear engagement feature is configured to cooperate with one of the plurality of engagement features of each of the plurality of transfer members.

13. The transmission of claim 7, further comprising another shaft gear including another shaft gear engagement feature configured to cooperate with one of the plurality of engagement features.

14. The transmission of claim 13, wherein the shaft gear engagement feature and the another shaft gear engagement feature are configured to cooperate with different engagement features of the plurality of engagement features.

15. The transmission of any of claim 13, wherein the at least one transfer member is configured to drive the shaft gear in a first direction about an axis of rotation, and the at least one transfer member is configured to drive the another shaft gear in a second direction about the axis of rotation.

16. The transmission of claim 6, further comprising an input for rotating the at least one transfer member, the input being provided by engine.

17. The transmission of claim 16, wherein the transmission is part of a rotary wing aircraft and at least one of the first output shaft and the second output shaft is coupled to a rotor system for driving a plurality of rotor blades about a rotational axis.

18. A transmission comprising:
a bearing block for supporting at least one rotatable shaft;
at least one rotatable transfer member having a plurality of engagement features, the at least one rotatable transfer member being mounted to an exterior of the bearing block, wherein the at least one rotatable transfer member has a generally hollow interior and a portion of the bearing block is received within the hollow interior; and
a shaft gear mounted to the at least one rotatable shaft and including a shaft gear engagement feature configured to cooperate with one of the plurality of engagement features.

19. The transmission of claim 18, wherein a first engagement feature of the plurality of engagement features is positioned at a first end of the at least one rotatable transfer member and when the shaft gear engagement feature is engaged with the first engagement feature, the at least one transfer member and the bearing block are nested within the shaft gear.

* * * * *